United States Patent [19]

Blechen

[11] 3,998,411
[45] Dec. 21, 1976

[54] SPEED OVERSHOOT CORRECTION SYSTEM

[75] Inventor: Frederick C. Blechen, Long Beach, Calif.

[73] Assignee: McDonnell Douglas Corporation, Long Beach, Calif.

[22] Filed: Feb. 17, 1976

[21] Appl. No.: 658,367

[52] U.S. Cl. .......................... 244/188; 73/178 R; 235/150.2; 340/27 R; 244/191

[51] Int. Cl.² .......................................... G05D 1/12

[58] Field of Search .......... 244/188, 191, 181, 182; 73/178 R; 235/150.2, 150.22; 340/27 R, 27 NA

[56] References Cited

UNITED STATES PATENTS

| | | | |
|---|---|---|---|
| 3,327,972 | 6/1967 | Greene | 244/188 |
| 3,618,878 | 11/1971 | Klein | 244/188 |

*Primary Examiner*—Trygve M. Blix
*Assistant Examiner*—Reinhard J. Eisenzopf
*Attorney, Agent, or Firm*—Henry M. Bissell

[57] ABSTRACT

A system for compensating for certain speed overshoot problems encountered in large instrument-controlled aircraft during long-term deceleration from high speeds, such as may be encountered in preparation for descent to landing approach from cruise conditions. During such long-term deceleration, the aircraft vertical gyro miss-erects due to an effect of the deceleration upon the gyro positioning control circuitry. The present system compensates for the gyro signal error, used for developing the aircraft speed command following deceleration, by the use of a threshold detector and filter to develop a compensation signal having a delay and amplitude related to the input control signals involved.

10 Claims, 3 Drawing Figures

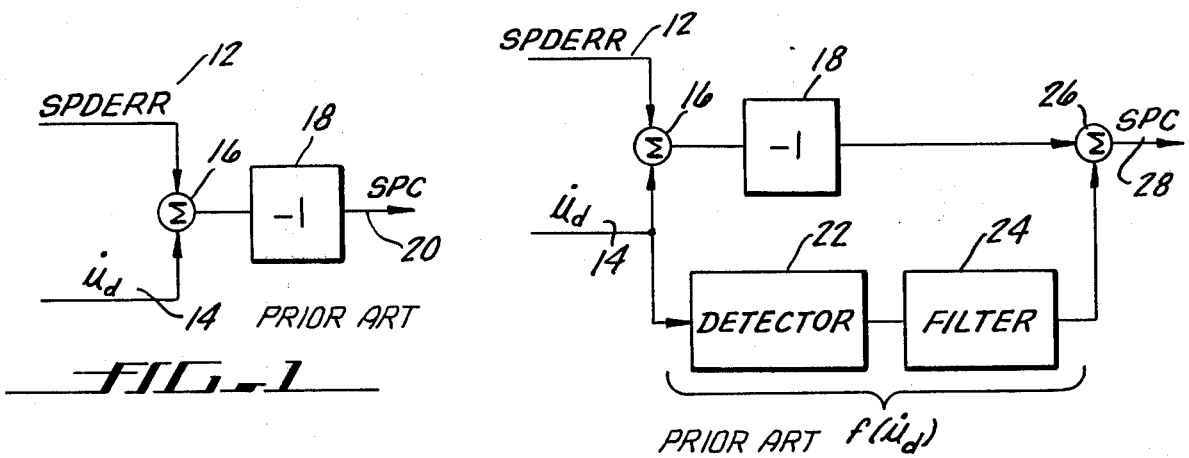
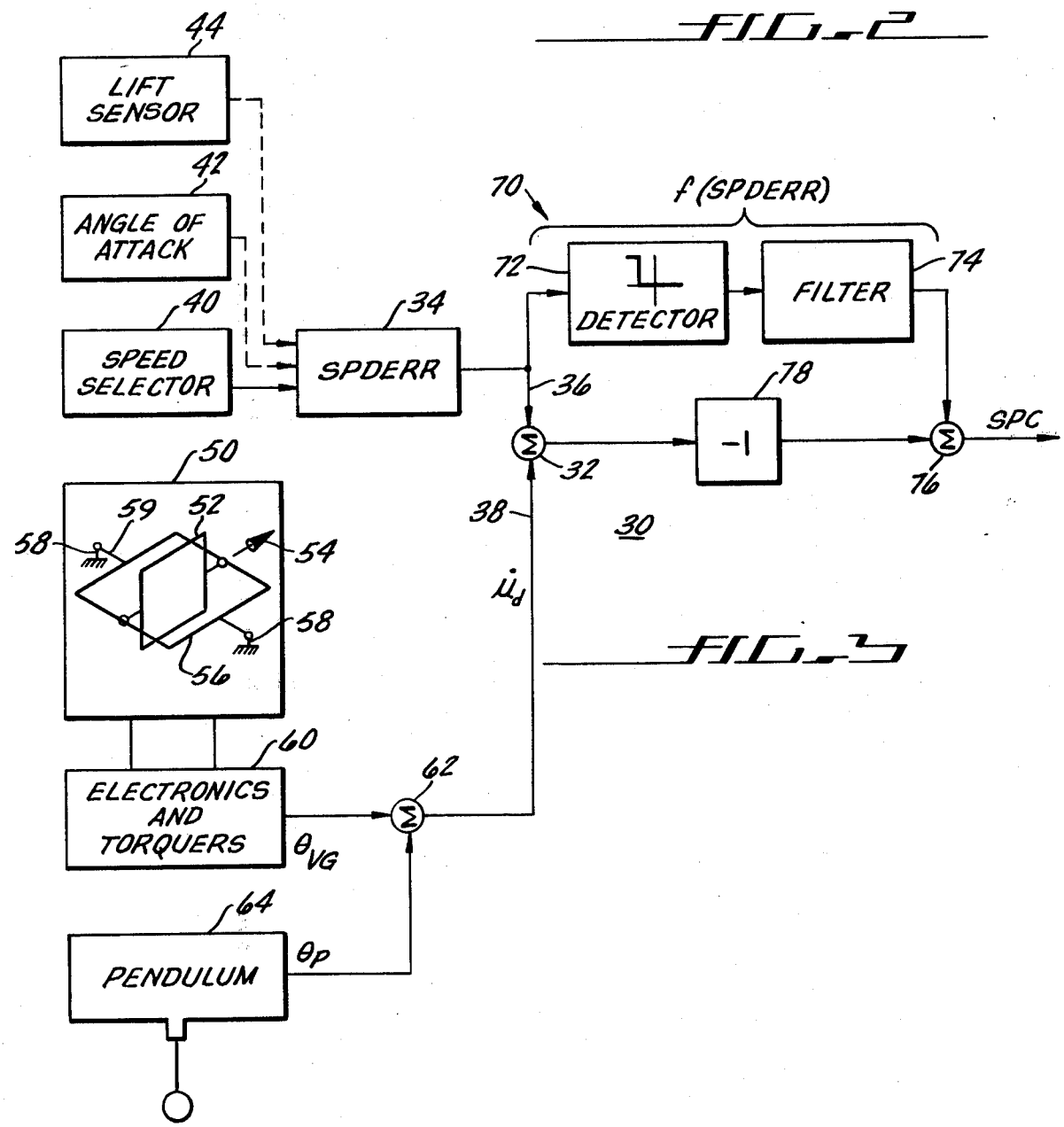

SPEED OVERSHOOT CORRECTION SYSTEM

BACKGROUND OF THE INVENTION

1. Field of the Invention.

This invention relates to aircraft speed control systems and, more particularly, to such systems for eliminating air speed overshoot problems which arise under particular flight conditions.

2. Description of the Prior Art.

Certain aircraft speed reference systems in present use on large commercial and military aircraft, such as passenger liners and cargo planes, employ a longitudinal acceleration damping (anticipation) signal which is derived from the difference between an accelerometer signal and a vertical gyroscope pitch attitude signal. (In certain systems a pendulum may be used as the source of the accelerometer signal. For the purpose of describing the present invention, it will be understood that this type of sensor is to be included in references to an accelerometer signal.) The accelerometer is mounted in the aircraft to be sensitive to longitudinal motion of the aircraft. Air speed overshoot is observed when using such prior art speed reference systems to capture and control the aircraft to a predetermined air speed after a long term deceleration from a much higher air speed. Such overshoot is undesirable to the extent that it may exceed the five-knot speed holding accuracy prescribed by the FAA for certain landing approach operations.

The undesirable air speed overshoot which is presently encountered in existing systems may be explained by considering that during a long term deceleration, the vertical gyro erection mechanism will cause the vertical gyro to slowly erect to the apparent vertical attitude as determined by the gyroscope levelling devices mounted on the inner platform of the vertical gyro. Such devices are inherently responsive to the effect of acceleration forces on the apparent gravity vector. A pendulum, which is used for detecting longitudinal acceleration, always aligns itself with the apparent vertical direction and a longitudinal accelerometer always has an output equivalent to the apparent vertical deviation from the true vertical, both indications being in addition to the actual pitch attitude. As the vertical gyro slowly erects to the apparent vertical direction (assuming zero degrees actual pitch attitude) an acceleration signal which is derived from the difference between the vertical gyro and the pendulum or accelerometer eventually goes to zero.

Approximate equations for the pendulum and for an accelerometer whose sensitive axes are longitudinal with respect to the aircraft are as follows:

$$\theta_P = \dot{\mu}/g + \sin\theta_T = \dot{\mu}/g + \theta_T *  \quad (1)$$

$$A_x = \dot{\mu} + g\sin\theta_T = \dot{\mu} + g\theta_T * \quad (2)$$

$$A'_x = \dot{\mu}/g + \sin\theta_T = \dot{\mu}/g + \theta_T * \quad (3)$$

where:

$\theta_P$ = pendulum angle (in degrees) from axis vertical to longitudinal
$\theta_T$ = true pitch attitude
$\dot{\mu}$ = acceleration of aircraft along flight path
g = gravitation constant (32.2 ft/sec²)
$A_x$ = Accelerometer output (ft/sec²)
$A'_x$ = Accelerometer output (in radians)
* for small angles such that $\sin\theta_T$ approximates $\theta_T$.

The derived acceleration signal for a perfect vertical gyro where $\theta_T = \theta_{VG}$, the attitude of the aircraft as measured by the vertical gyro, may be expressed as follows:

$$\dot{\mu}_d = \theta_P - \theta_{VG} = \dot{\mu}/g + \theta_T - \theta_T = \dot{\mu}/g \quad (4)$$

where $\dot{\mu}_d$ = the derived acceleration (in radians).

In the case where an imperfect, or miss-erected, vertical gyro is used, the output of the vertical gyro is as follows:

$$\theta_{VG} = \theta_T + \dot{\mu}/g \quad (5)$$

The $\dot{\mu}/g$ term results from the gyro erecting to the apparent vertical direction where the deviation of apparent vertical from true vertical is equal to the acceleration term affecting the levelling device or accelerometer inside the vertical gyro erection mechanism.

The derived acceleration signal for the imperfect vertical gyro which has sufficient time to fully miss-erect then becomes:

$$\dot{\mu}_d = \theta_P - \theta_{VG} = \dot{\mu}/g + \theta_T - \theta_T - \dot{\mu}/g = 0 \quad (6)$$

Thus it may be seen that the derived acceleration term goes to zero under such conditions when in fact the aircraft is still decelerating. Furthermore, when the aircraft stops decelerating, the imperfect or miss-erected vertical gyro takes some substantial time to re-erect and the $\dot{\mu}/g$ term is initially retained, thus producing a false derived deceleration signal until the gyro has time to correctly erect itself, a period of approximately one to two minutes.

Using Equation (5) for the miss-erected vertical gyro, the equation for deriving the acceleration signal under a condition of no acceleration is:

$$\dot{\mu}_d = \theta_P - \theta_{VG} = \theta_T - \theta_T - \dot{\mu}/g = -\dot{\mu}/g \quad (7)$$

The $\dot{\mu}/g$ term in Equation (7) is the miss-erection term from the vertical gyro which goes to zero in approximately 1 to 2 minutes. The speed overshoot can be shown to be caused by the erroneous acceleration term derived in Equation (7). An equation for a speed reference system using a speed error term (which is preferably a function of air speed or angle of attack but may also be developed from a lift sensor or some other parameter detector) and a derived acceleration term is as follows:

$$SPC = -(SPDERR + \dot{\mu}_d) \quad (8)$$

where:

SPC = speed command to pilot or automatic throttle (+ means to move throttles forward)
SPDERR = airspeed or other preselected parameter error (+ means overspeed)
$\dot{\mu}_d$ = derived acceleration (+ means accelerating)

Equation (8) shows absence of command to move the throttles when the term SPC is equal to zero. If $\dot{\mu}_d$ is erroneous, as indicated in Equation (7), due to a long term deceleration, the initial no acceleration case finds $\dot{\mu}_d$ position and equal to $-\dot{\mu}/g$. (For a deceleration, $\dot{\mu}$ is negative, making the term "$-\dot{\mu}/g$" positive). The speed command term SPC from Equation (8) will only be zero, indicating no command to move the throttles, when the SPDERR term is negative or slow (which causes the overshoot that is encountered in the aircraft instrumentation system following a long term deceleration).

There have been attempts to solve the speed overshoot problem discussed above. One such attempt has involved the provision of an attempted compensation signal which is operative upon detection of the fact that the aircraft is decelerating. This proposed solution to the problem utilizes a filter in series with the deceleration detector to develop an additional slowly changing signal for the desired compensation. However, this attempted solution method is deficient during long term decelerations in which the derived acceleration term $\dot{\mu}_d$ of Equation (8) goes to zero, with the result that the compensation signal from the added filter slowly returns to zero while the aircraft is still decelerating. Under such conditions, the effects of the gyro miss-erection on the derived acceleration signal are no longer cancelled and the aircraft will overshoot the desired air speed as before. Clearly this is not a solution but a mere alleviation of the problem.

SUMMARY OF THE INVENTION

In brief, arrangements in accordance with the present invention provide a solution to the above-described problem by insuring that when the aircraft encounters a long term deceleration, the undesired overshoot (i.e. developing an air speed which is less than that desired) is prevented, even in the event of complete gyro miss-erection to the extent that the derived acceleration term, $\dot{\mu}_d$ of Equation (6), goes to zero.

Preferred embodiments of the present invention incorporate a threshold detector and filter in the instrumentation system which are responsive to a control signal (which may be related to the speed of the aircraft, the angle of attack or some other preselected parameter) above a predetermined level. In such a case, when the threshold of the detector is exceeded, an additional component is injected into the speed command (SPC) prior to the start of a deceleration from the high air speed in anticipation of an eventual deceleration. The same result also occurs during deceleration if the pilot changes the control (SPDERR) signal sufficiently to exceed the detector threshold. Under the conditions described, with the air speed decreasing during deceleration, the detector output goes to zero causing the filter to also go to zero but at a very slow rate. The change of filter output during return to zero is designed to correspond to the simultaneous settling of the speed of the aircraft on the desired air speed and the recovery of the vertical gyro to its proper erection attitude. The rate of return to zero of the filter output approximately cancels the error in the derived acceleration term which is caused by miss-erection of the vertical gyro. Thus, the present invention uses a control signal, preferably derived either from air speed or angle of attack, to determine that a deceleration will eventually, at some later time, take place or that it is taking place. This signal is removed by the threshold detector when it becomes small, indicating that the deceleration is about to terminate, in order to compensate for the vertical gyro miss-erections which occur during decelerations. The system is useful only in automatic throttle control systems or in speed command systems used on aircraft where the acceleration dampening term is derived from an accelerometer or pendulum signal offset against a vertical gyro signal. However, such types of systems are presently in use in many of the multi-engine aircraft operated by commercial airlines.

BRIEF DESCRIPTION OF THE DRAWING

A better understanding of the present invention may be had from a consideration of the following detailed description, taken in conjunction with the accompanying drawing, in which:

FIG. 1 is a block diagram illustrating the operation of a speed control system presently in use and subject to the overshoot problem described above;

FIG. 2 is a block diagram indicating the operation of one particular prior art system which has attempted to solve the problem described; and FIG. 3 is a combination block and schematic diagram representing the present invention.

DESCRIPTION OF THE PREFERRED EMBODIMENT

In the prior art system represented in FIG. 1, the control signal 12 (SPDERR) and the derived acceleration signal 14 ($\dot{\mu}_d$) are combined in a summing stage 16 to develop a composite signal which, after inversion in the inverting stage 18, becomes the output signal 20 (SPC). The signals 12 and 14 are positive for "fast" and "accelerate", respectively, and a positive output signal 20 corresponds to a speed command to move the throttles forward. The functional equation for the system of FIG. 1 is as follows:

$$SPC = -(SPDERR + \dot{\mu}_d) \qquad (9)$$

As described hereinabove in connection with Equation (7), the derived acceleration term includes the miss-erection term from the vertical gyro which takes from one to two minutes to work itself out of the system. The result is the overshoot in air speed at the reduced preset level which has already been described.

FIG. 2 represents one known prior art attempt to solve the problem which provides some improvement but falls short of a complete and satisfactory answer. In the system represented in FIG. 2, the same input signals 12 and 14 are applied to a summing stage 16 with the composite result being inverted by an inverter stage 18. However, the input signal 14 is also applied to an additional channel which includes a detector 22 having a predetermined threshold and a filter 24. This channel thus operates to develop a function of the input signal 14—f($\dot{\mu}_d$). The output of the filter stage 24 and the output of the inverter stage 18 are then applied to a second summing stage 26 with the composite result at the output 28 being provided as the speed command signal. The functional equation of the arrangement of FIG. 2 is as follows:

$$SPC = -(SPDERR + \dot{\mu}_d) + f(\dot{\mu}_d) \qquad (10)$$

In the operation of the arrangement of FIG. 2, a signal is only present at the output of the detector 22 when the detector 22 responds to a negative input signal 14 (thus indicating that the aircraft is decelerating). Since the vertical gyro will miss-erect very slowly during deceleration, the signal then present at the output of the detector 22 is applied to the filter 24 to produce a signal at the filter output which also changes very slowly, due to the long time constant of the filter 24. This signal combines with what in FIG. 1 was the speed command SPC signal to develop an output signal at 28 which is more positive than it would otherwise be, thus providing a command for more advanced throttles. This compensates for a time the vertical gyro miss-erection which occurs during deceleration and, during the period of compensation, produces a less negative speed command signal at the output 28. When the aircraft reaches its desired speed, the derived acceleration signal at 14 goes below the threshold of the detector 22 so that the detector output becomes zero. The filter 24 then slowly returns its output signal to zero, approximating the vertical gyro's slow erection to vertical attitude. This system fails to meet the problem during long term decelerations where the vertical gyro has time to miss-erect with the result that the derived acceleration term $\mu_d$ goes to zero while the aircraft is still decelerating. For periods of time exceeding the response time of the filter 24 after the derived acceleration term has gone to zero, the system of FIG. 2 functions exactly like the system of FIG. 1.

FIG. 3 represents in combination block and schematic diagram form a system 30 embodying the present invention. As shown in FIG. 3, the system 30 comprises a summing stage 32 coupled to receive a control signal from an SPDERR stage 34 via a first input line 36 for combination with a derived acceleration signal $\mu_d$ on a second input line 38. As indicated by the solid line connection at the input of the SPDERR stage 34, the particular control signal in the embodiment represented in FIG. 3 originates from a speed selector stage 40 and the particular control signal is a speed error signal. However, it may be developed from other control functions, such as a signal from sensor stage 42 indicating the angle of attack of the aircraft during let down, a signal from a lift sensor stage 44 conventionally mounted near the leading edge of the aircraft wing, or some other detector or indicator of some parameter indicative of airspeed of the aircraft.

The acceleration signal on line 38 is derived in conventional fashion from devices and circuitry well-known in the art. In brief, a vertical gyro stage 50 is shown having an inner platform or gimbal ring 52 which is oriented in a vertical plane parallel to the longitudinal axis of the aircraft. This axis and the direction of aircraft travel are indicated by the arrow 54. In a gyroscope of conventional type, the platform 52 would include a spinning weight secured to a vertical weight shaft, the ends of which are journalled in a vertical gimbal ring. the platform 52 is journalled to turn on a roll axis coincident with the longitudinal axis of the aircraft, indicated by the arrow 54, relative to a second, outer platform or gimbal ring 56. The journal mounting points of the platform 56 are attached to aircraft frame structure, represented by the symbols 58, so that the outer platform may rotate about the pitch axis 59 which is orthogonal to the longitudinal axis of the aircraft.

In a vertical gyro of this type, the two platforms of the gyro are intended to be unaffected when the aircraft changes its pitch angle about the pitch axis 59. Consequently, the inner platform 52 is intended to remain in a vertical plane despite any change in the nose-up or nose-down attitude of the aircraft.

Associated with the gyro 50 are suitable electronics and torquing units, indicated in the electronics and torquers stage 60, which drive the gyroscope and provide output signals therefrom. Under various accelerations, either positive or negative, the electronics and torquers 60 may be affected in their control of the vertical gyro 50 in a way which results in a misinterpretation of the acceleration as a change in attitude. Under such conditions, the torquers in the stage 60 cause the vertical gyro 50 to miss-erect slowly—i.e. to move the inner platform 52 out of the true vertical plane.

In order to develop the derived acceleration signal on the line 38, the output signal from the electronics and torquer stage 60 is applied to a summing stage 62 for combination with an accelerometer signal, indicated as derived from a pendulum 64. As indicated above in connection with Equations (5) and (7), this derived acceleration term contains an error which is developed by the imperfection and miss-erection in the vertical gyro 50, outputted through the electronics and torquer stage 60.

To compensate for this error and provide a solution to the problem set forth above, the system 30 of the present invention further includes a compensation channel 70 having a threshold detector stage 72 followed by a filter 74 in series. The output of the filter 74 in the compensation channel 70 is applied to an output summing stage 76, connected to receive as a second input the output of the summing stage 32, reversed in polarity by the inverter 78.

The control signal on the line 36 at the input to the summing stage 32 is also applied to the input of the detector 72. In operation of the circuit of FIG. 3, the detector 72 blocks all input control signals which are less positive than its preset threshold. When the control signal from the stage 34 exceeds the threshold level of detector 72, the output of the detector 72 becomes positive and the filter 74, preferably a resistor-capacitor network, is slowly charged by the detector 72 output signal. In turn, the filter output signal becomes positive, thus making the SPC signal at the output of the summing stage 76 more positive (or less negative) to develop an advance of the throttles setting over what the setting would be if the speed control signal were directly applied. This sequence may occur prior to the start of deceleration in anticipation thereof or it may occur during deceleration where there is a change in the control signal from the stage 34 by an amount sufficient to develop an output from the threshold detector 72. The net speed control command (SPC) is still negative under such conditions due to a large negative (fast) control signal from the SPDERR stage 34 which initiates or maintains the deceleration. As the control signal decreases while the aircraft decelerates, the output of the detector 72 returns its output to zero when its threshold is reached. The detector's threshold is set to the level of a SPDERR control signal corresponding to a positive output SPC signal which is desired to assist in the closure on the desired air speed. Thereafter, the filter 74 output slowly returns to zero, the time constant of the filter 74 being selected to correspond to the time it takes for the air speed to settle at the desired level as the vertical gyro 50 recovers its proper erection. Thus, the system 30 provides the desired compensation for the error in the derived acceleration term $\mu_d$ due to vertical gyro miss-erection.

Although there have been described above specific arrangements of a speed overshoot correction system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. Apparatus for compensating for errors in aircraft control signals resulting from gyroscope signal errors developed during long term decelerations, which apparatus comprises:
   a control signal source;
   means for providing a derived acceleration signal for combination with the control signal;
   an input summing stage connected to develop a composite signal from a combination of the control signal and the derived acceleration signal;
   a second summing stage connected to provide an output signal for controlling the aircraft;
   a signal inverter connected between the output of the first summing stage and an input of the second summing stage; and
   a compensation channel connected between the control signal source and a second input to the second summing stage for providing a compensation signal at the second summing stage to correct for a vertical gyro error component in the signal at the first input of the second summing stage.

2. Apparatus in accordance with claim 1 wherein the compensation channel comprises a detector and filter in series.

3. Apparatus in accordance with claim 2 wherein the detector is connected adjacent the input to the compensation channel and the filter is connected at the output thereof.

4. Apparatus in accordance with claim 3 wherein the detector is connected to receive the control signal at its input.

5. Apparatus in accordance with claim 3 wherein the detector comprises a threshold detector having a predetermined threshold level.

6. Apparatus in accordance with claim 5 wherein the detector threshold level is preset to correspond to a predetermined level of control signal.

7. Apparatus in accordance with claim 6 wherein the output signal from the second summing stage is a speed command signal for controlling engine throttle setting and wherein the threshold level of the detector is preset to a level of control signal where a positive output signal is needed to assist in closure on the air speed selected by the input control signal.

8. Apparatus in accordance with claim 7 wherein the filter has a predetermined time constant for response to signals at its input.

9. Apparatus in accordance with claim 8 wherein the time constant of the filter is selected to correspond to the time required for the error in the derived acceleration signal to disappear.

10. Apparatus in accordance with claim 7 wherein the input control signal is derived from the aircraft speed selector.

* * * * *